(12) United States Patent
Holloway et al.

(10) Patent No.: US 7,310,085 B2
(45) Date of Patent: Dec. 18, 2007

(54) USER INTERACTIVE COMPUTER CONTROLLED DISPLAY SYSTEM ENABLING A USER REMOTE FROM A DISPLAY SCREEN TO MAKE INTERACTIVE SELECTIONS ON THE DISPLAY SCREEN WITH A LASER BEAM PROJECTED ONTO THE DISPLAY SCREEN

(75) Inventors: Lane Thomas Holloway, Pflugerville, TX (US); Charles Gorham Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 10/829,830

(22) Filed: Apr. 22, 2004

(65) Prior Publication Data
US 2005/0237297 A1    Oct. 27, 2005

(51) Int. Cl.
*G09G 5/00*    (2006.01)
(52) U.S. Cl. ...................................... 345/158
(58) Field of Classification Search ........ 345/157–158, 345/180, 156; 356/3.01, 3.16; 715/730, 715/743; 358/89; 702/150; 178/18.09; 349/7, 22; 353/46, 82
See application file for complete search history.

(56) References Cited

U.S. PATENT DOCUMENTS 7,134,080 B2 * 11/2006 Kjeldsen et al. ............ 715/730

* cited by examiner

*Primary Examiner*—Richard Hjerpe
*Assistant Examiner*—Abbas I. Abdulselam
(74) *Attorney, Agent, or Firm*—Julius B. Kraft; Gregory M. Doudnikoff

(57) ABSTRACT

A display screen interface implementation in a computer controlled user interactive display system, for enabling an interactive user to select specific items on a large presentation display screen, comprising laser apparatus for projecting a laser beam pointer image onto the display screen, apparatus for interactively moving the projected laser pointer orthogonally with respect to the display screen, apparatus for tracking the orthogonal movement and position of the projected laser bean pointer and apparatus enabling the user to make interactive selections on the display screen based upon the orthogonal position of the projected laser bean pointer. For best results in preferred embodiments, the laser beam pointer is handheld.

18 Claims, 5 Drawing Sheets

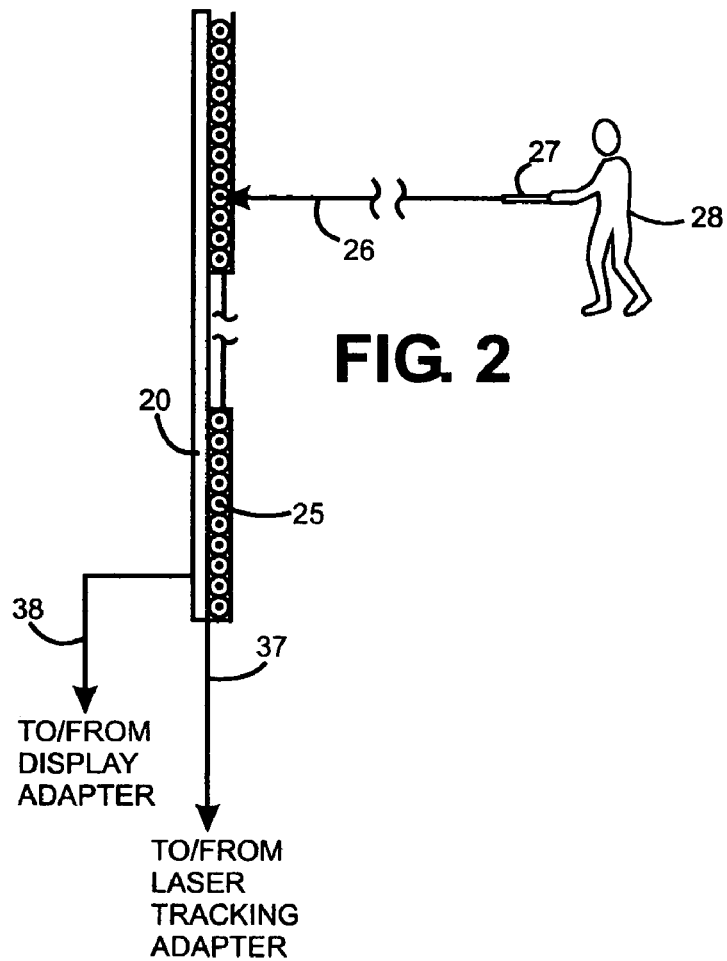
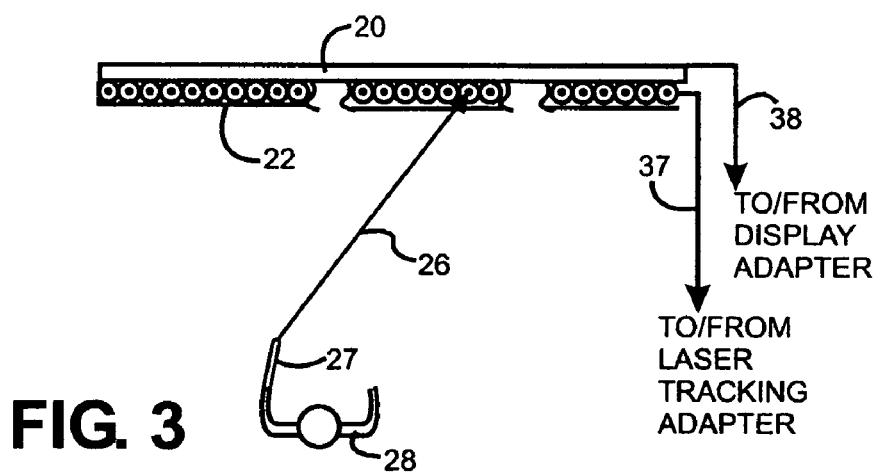

USER INTERACTIVE COMPUTER CONTROLLED DISPLAY SYSTEM ENABLING A USER REMOTE FROM A DISPLAY SCREEN TO MAKE INTERACTIVE SELECTIONS ON THE DISPLAY SCREEN WITH A LASER BEAM PROJECTED ONTO THE DISPLAY SCREEN

TECHNICAL FIELD

The present invention relates to user interactive computer supported display technology and particularly to larger interactive display systems to be used in lectures and presentations to relatively large audiences.

BACKGROUND OF RELATED ART

The past decade has been marked by a technological revolution driven by the convergence of the data processing industry with consumer electronics industries. As a result of these changes, it seems as if virtually all aspects of human endeavor in the industrialized world requires human-computer interfaces. There is a need to make computer directed activities accessible to many people who may still be indifferent to the benefits of using a computer for new functions. There are great numbers of potential users highly skilled in a variety of technological, business and educational fields who use computers only to the extent absolutely necessary. Thus, they use computers for word processing and Internet access, but are resistant to other significant functions. These users are resistant because they consider the other computer controlled functions not user friendly, i.e. the applications are not intuitive or dynamic. The functions require an initial investment of time in the learning curve and must be continually used or they will be easily forgotten. Computer controlled or computer aided presentations are one such category of computer functions. These applications have provided excellent presentation tools to teachers and academic lecturers who regularly make such presentations. On the other hand, potential users in the business and technological field who make presentations less frequently have shown a resistance to such presentation applications due to a real or perceived impression that the applications are not intuitive or dynamic enough for the casual or less regular user. This is particularly the case with applications for user interactive presentations in which the presenter, who is remote from the display screen, needs to make interactive choices in the material presented in furtherance of his presentation or in response to audience inquiries or interests. In present advanced presentation setups, the presenter who IS remote from the display screen uses a wireless mouse, e.g. a mouse that is wirelessly connected to the computer that controls the display through infrared transmissions. Wireless mouse technology for big display screen presentations may be less than intuitive and somewhat intimidating to business and scientific presenters who are not computer sophisticated.

SUMMARY OF THE PRESENT INVENTION

The present invention provides an implementation for remotely interacting with and making selections on remote computer controlled presentation display screens that is direct and provides direct visual positional feedback to the interactive user, and is, thus, more direct and intuitive than the wireless infrared mouse. The present invention makes use of handheld, or at least directly hand-controlled, laser pointer device that projects user-harmless low energy laser beams onto the remote large presentation display screens. Such beams provide direct hand to eye visual feedback as the presenter traverses the display screen in moving to his selections. The laser devices and the laser beams produced act as an extension of the user's hand movement with respect to the remote display screen. Also, these low energy laser beam devices have been used for decades in place of stick pointers in presentations with charts, projected transparent foils and slides. Thus, users consider such laser beam pointers to be very simple and intuitive.

Accordingly, the present invention provides a display screen interface implementation in a computer controlled user interactive display system for enabling an interactive user to select specific items on a large presentation display screen, comprising laser apparatus for projecting a laser beam pointer image onto said display screen, apparatus for interactively moving said projected laser pointer orthogonally with respect to said display screen, apparatus for tracking said orthogonal movement and position of said projected laser beam pointer. The apparatus enables the user to make interactive selections on said display screen based upon said orthogonal position of said projected laser beam pointer. For best results in preferred embodiments, the laser beam pointer is handheld.

The present invention operates effectively when there is a wireless connection means between the laser apparatus for projecting the laser beam and the apparatus for tracking the orthogonal movement and position of said projected laser beam pointer with respect to the display screen that is a function of the computer control of the display screen.

The wireless connection means could be implemented to include means associated with said display screen for sensing said projected laser beam, particularly laser beam sensors that sense the position of the projected laser beam with respect to the display screen. In another implementation, the display screen is rectangular and the wireless connection means includes means for orthogonally defining a pair of diagonal vertices of said rectangular screen relative to the position of said projected laser beam pointer image on said screen. Then, as will be hereinafter described in greater detail, the physical orthogonal position of the apparatus projecting the laser beam pointer with respect to the defined rectangular display screen is fed back to the display control apparatus preferably via infrared transmission to thereby enable the coordination of the laser beam pointer projection with the defined orthogonal screen.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 2 is a simplified diagrammatic side view of the use of the laser beam pointer in the system of FIG. 1;

FIG. 3 is a simplified diagrammatic plan or top view of the use of the laser beam pointer in the system of FIG. 1;

DETAILED DESCRIPTION OF THE PREFERRED EMBODIMENT

Figure 1:
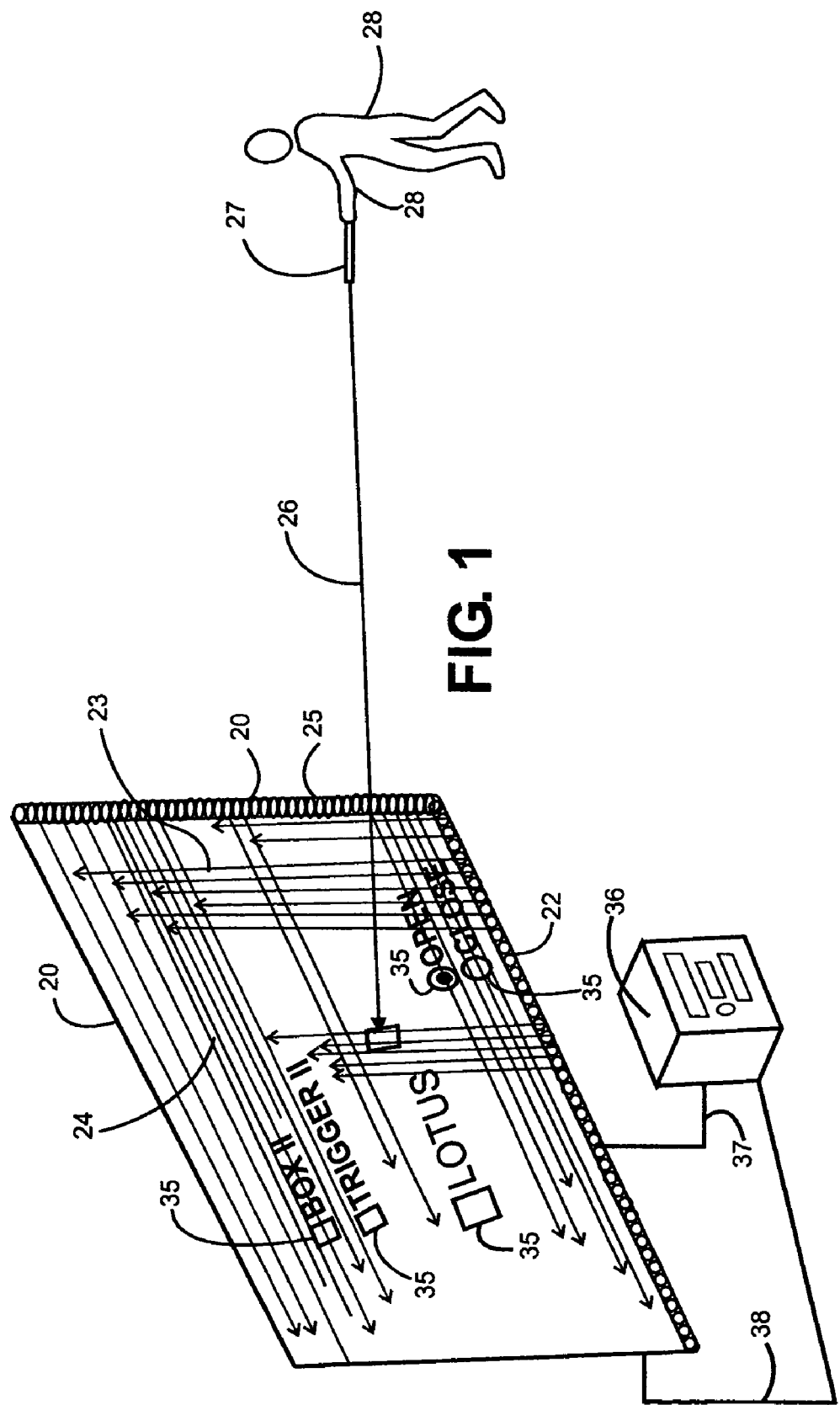
FIG. 1 is an overall diagrammatic view of a presenter using the projected laser beam pointer in accordance with the present invention with respect to a large computer controlled interactive display.

Referring to FIG. 1, the presentation set up includes large display 20 connected via connection 38 to controlling computer 36. The display 20, that is large enough to be visible in a group presentation, may be a conventional front or back projection display or a controlled LCD or gas panel display. The display may be in the order of three feet by five feet in size. It contains the graphics and text appropriate to the content of the presentation. The screen also contains user interactive regions 35 that the user may select to trigger changes in the display or the content of the display. In making his presentation, the presenter 28, who is remote from display, projects a laser beam pointer 26 to form a corresponding cursor or pointer image on the display 20. The laser beam pointer 26 is projected by handheld projector 27 that may be any conventional low power Class I laser beam that has been in general usage as a pointer for almost 20 years. As shown, this laser beam provides direct and immediate visible feedback to the presenter 28. However, in order for the system to be interactive, means have to be provided for tracking the position of the projected laser beam 26 with respect to interactive display 20. This is provided by a pair of orthogonal X,Y lines 22 and 25 of laser beam emitter/sensors that are respectively aligned along a Y edge and an X edge of display 20 where the laser beam emitter/sensors respectively emit laser beam lines 23 and laser beam lines 24 (shown partially for convenience in illustration). Crossing laser beam lines 23 and 24 forms a matrix of laser beams that may dynamically sense the position of the presenter projected beam 26 and feed this position back to controlling computer 36 via connection 37. By this arrangement, the position of laser beam 26 is continuously tracked and stored in computer 36 and is, thus, known and marked when the presenter wishes to make an interactive selection, as will be hereinafter described in greater detail. The apparatus providing laser beam emitter lines 22 and 25 are standard low power laser beam strips in which the lower power Class I beams are aligned with about a quarter to a half inch spacing for a conventional three by five foot display. The respective laser emitter strips are mounted along the respective edges but spaced from the display screen proper. Accordingly, as the projected laser beam 26 moves, it breaks emitted beams in the X,Y matrix to thereby permit tracking of the position of laser beam 26 in display controlling computer 26.

FIGS. 2 and 3 clarify and further illustrate what has been described with respect to FIG. 1. FIG. 2 shows a side view of user 28 projecting laser beam pointer 26 from handheld laser beam projector 27 onto display screen 20 and tracking by the strip or line of laser emitters 25. FIG. 3 shows a top view of user 28 projecting laser beam pointer 26 from handheld laser beam projector 27 onto display screen 20 and tracking by the strip or line of laser emitters 22.

Figure 5:
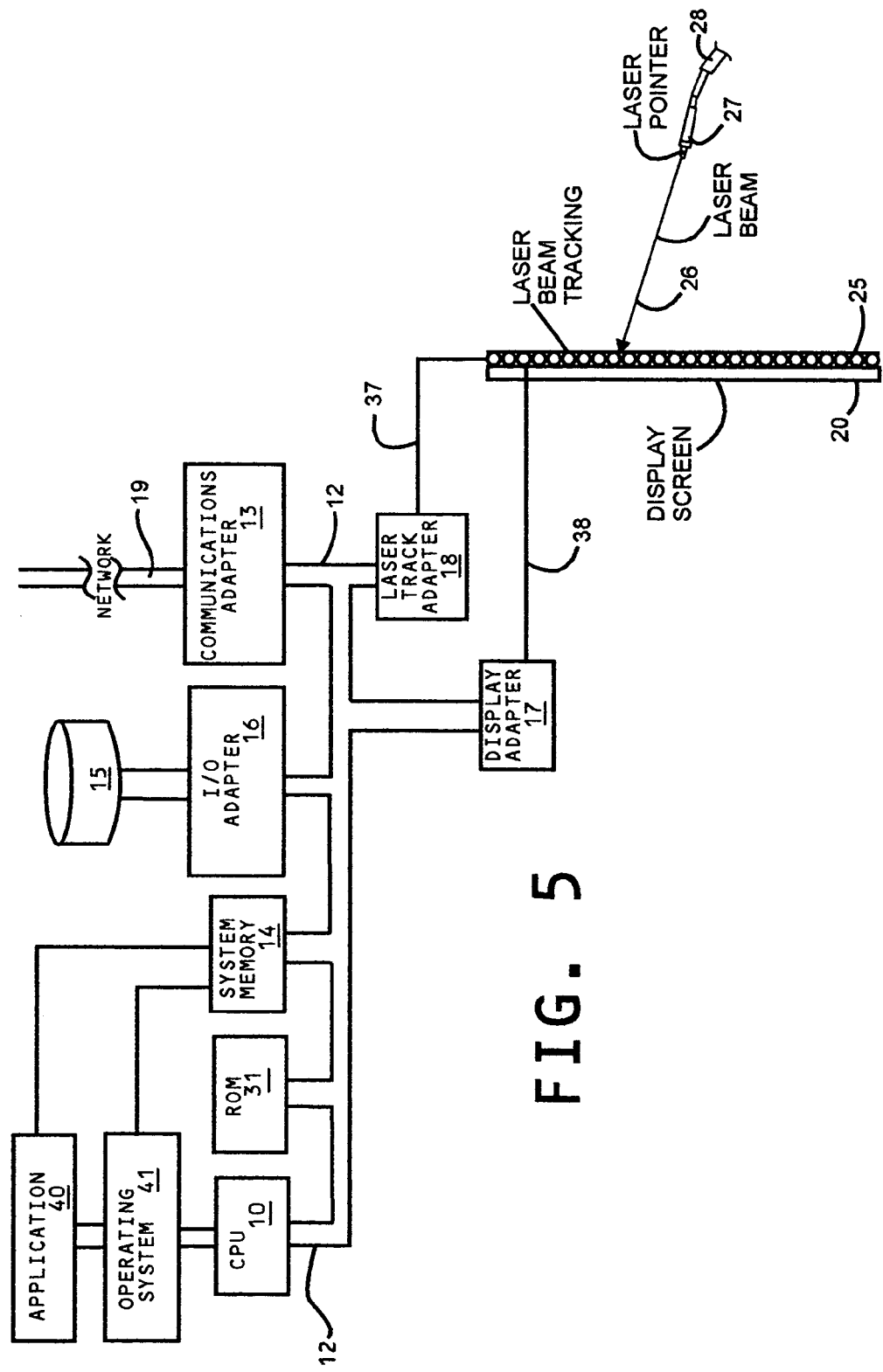
FIG. 5 is a partial diagrammatic view of the system of FIG. 1 illustrating the computer control for the display and its correlation of the sensed laser beam pointer positions.

The display 20 is connected to a display adapter in computer 36 via connecter 38 while the laser beam tracking emitter beam strips 22 and 25 are connected to a laser tracking adapter in computer 36 via connector 37 as will hereafter be described in greater detail with respect to FIG. 5.

Figure 4:
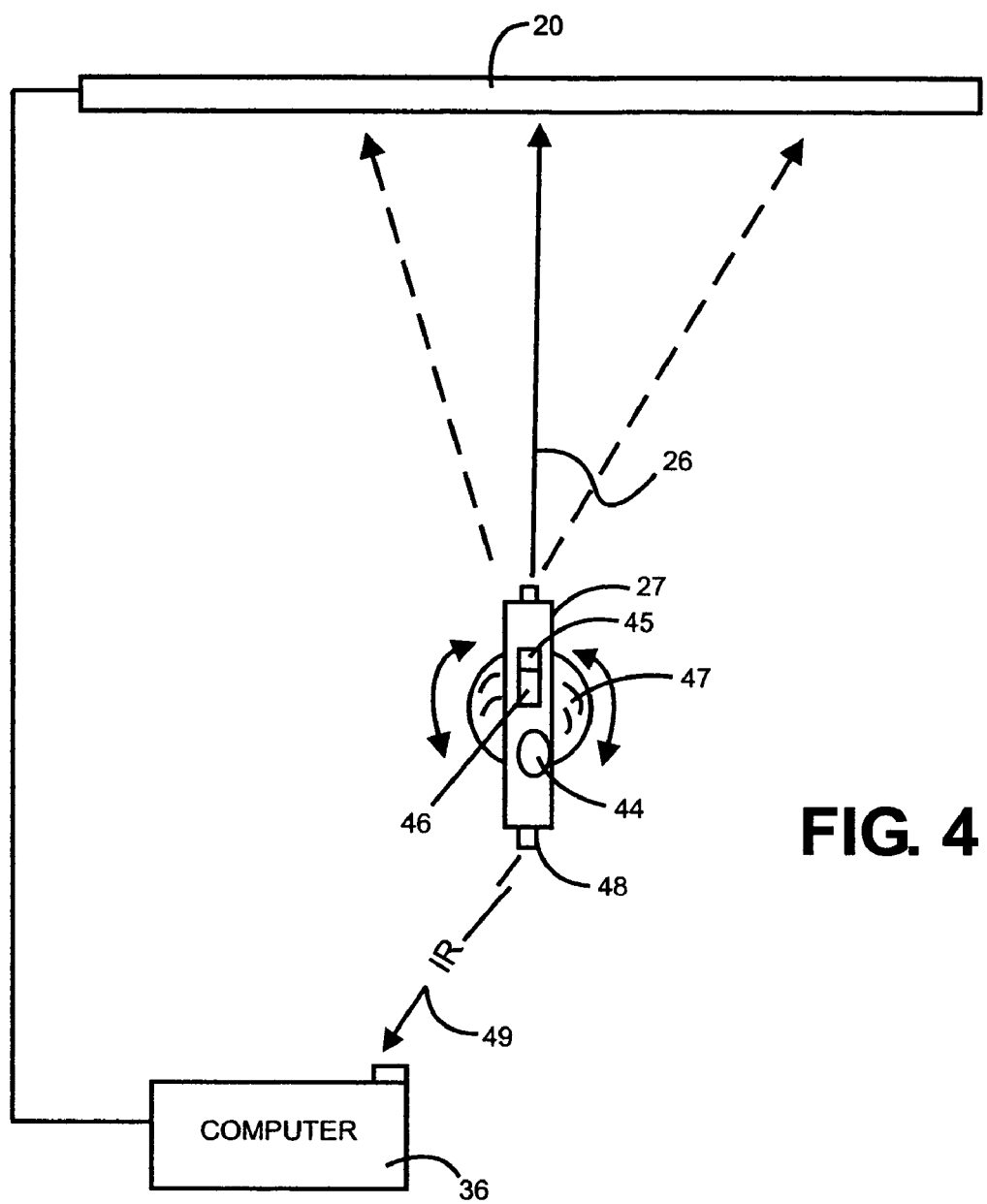
FIG. 4 is a simplified diagrammatic plan view of an alternative embodiment of the present invention.

Referring now to FIG. 4, there will be described a variation of the present invention wherein projected laser beam 26 is dynamically tracked without the use of laser beam emitter strips. The laser beam projector sends laser beam 26 onto display screen 20. Assuming display screen 20, shown in this plan view, to be rectangular, the user first moves projector 20 to one of the corners or vertexes of the rectangular screen 20. This position is fixed and fed back to display controlling computer 36 via IR (infrared) signal 49 from IR port 48. Similarly, the vertex or corner of screen 20 diagonally opposed to the initial fixed corner of the display screen is also fixed and its position fed back to computer 36. With the two diagonal corners thus fixed, all possible laser beam positions on rectangular display screen 20 may be tracked and fed back to computer 36 via IR signal transmission 49. Since this manner of projected laser beam tracking requires some steadiness in a handheld laser projector 27, the stabilized projector structure shown in FIG. 4 may be used. The beam projector may be mounted, e.g. on swivel ball 47, so as to be movable in all directions. The X,Y movement may be directed via scroll wheel 44 and selections made via control buttons 45 and 46 to thereby effectively provide a scroll mouse set, wherein scrolling is done through wheel 49 and selections via buttons 45 and 46.

Referring now to FIG. 5, the computer control system that coordinates the tracked laser beam positions with the display content and selectability will be described. The display control system includes a central processing unit (CPU) 30, such as one of the PC microprocessors or workstations, e.g. RISC SYSTEM/6000™ workstation series available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WINDOWS98™ or WINDOWSNT™ operating systems, as well as UNIX and other IBM AIX operating systems.

Figure 6:
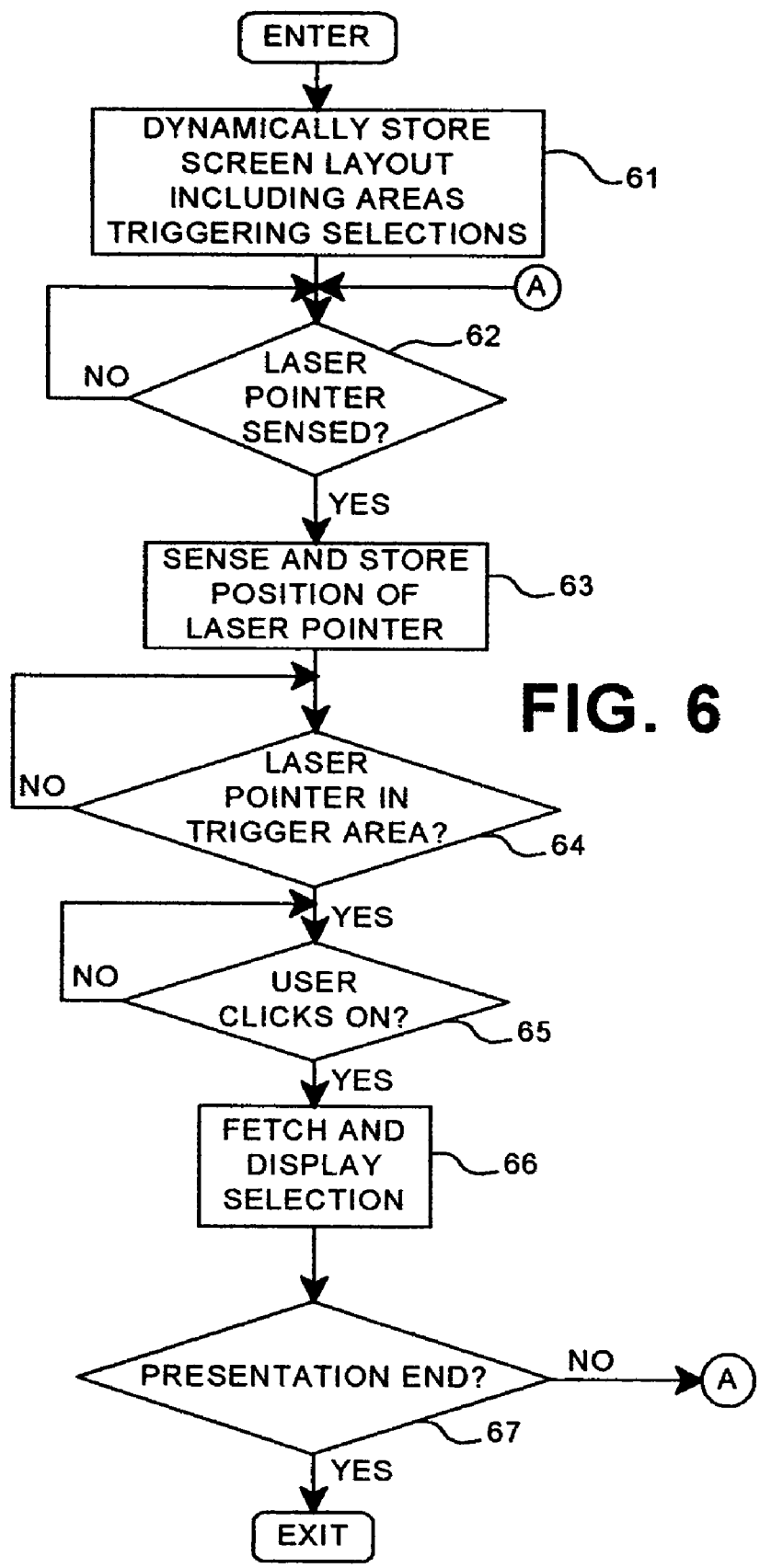
FIG. 6 is a simplified programming routine illustrating how the projected laser beam pointer may relate to the display in the making of user/presenter interactive selections.

A Read Only Memory (ROM) 31 is connected to CPU 30 via bus 12 and includes the Basic Input/Output System (BIOS) that controls the basic computer functions. RAM 14, I/O adapter 16 and communications adapter 13 are also interconnected to system bus 12. I/O adapter 16 communicates with the disk storage device 15. Communications adapter 13 interconnects 19 bus 12 with an outside network enabling the data processing system to communicate with other systems. Such networked systems include a Local Area Network (LAN) or a Wide Area Network (WAN), which includes, of course, the Web or Internet. The movements of projected laser beam 26 are transmitted to laser tracking adapter 18 via connector 37 to be coordinated with the CPU control of display 20 via display adapter 17. Display adapter 17 includes a frame buffer (not shown) that is a storage device that holds a representation of each pixel on the display screen 20. Images may be stored in frame buffer 39 for display on display screen 20. With respect to FIG. 6, there will be described a simple representative routine that illustrates the operation coordinating the dynamically sensed projected laser pointer beams with the presentation display content. The screen content is stored so as to dynamically maintain the display screen, step 61. A determination is made as to whether the laser beam pointer has been sensed, step 62. If No, the sensing of the laser beam is awaited. If Yes, the position of the laser beam pointer is dynamically tracked and stored, step 63. A determination is then made, step 64, as to whether the laser pointer has entered a trigger area. If No, such entry is awaited. If Yes, a further determination is made as to whether the presenter has selected, i.e. clicked on, the trigger area, step 65. If Yes, the triggered event is obtained and displayed, step 66. At this point, a determination is made, step 67, as to whether the presentation is at an end. If Yes, the presentation is exited. If No, the process is returned via branch "A" to step 62.

Other techniques may be used to correlate the projected laser beam with the displayed screen content. Any approach that permits the laser projection pointer to remain remote and wireless with respect to the computer controlled display. For example, techniques that dynamically photo or video record the movement of the laser beam projected image on the display screen and then correlate such stored images with the displayed content could be used in the practice of this invention.

Although certain preferred embodiments have been shown and described, it will be understood that many changes and modifications may be made therein without departing from the scope and intent of the appended claims.

What is claimed is:

1. In a computer controlled user interactive display system, a display screen interface implementation for enabling an interactive user to select specific items on a display screen comprising:
   laser apparatus for projecting a laser beam pointer image onto said display screen;
   apparatus for interactively moving said projected laser pointer orthogonally with respect to said display screen;
   apparatus for tracking said orthogonal movement and position of said projected laser beam pointer with respect to the display screen; and
   apparatus enabling said user to make interactive selections on said display screen based upon said orthogonal position of said projected laser beam pointer.

2. The computer controlled display system of claim 1 further including a wireless connection means between the laser apparatus for projecting said laser beam and said apparatus for tracking the orthogonal movement and position of said projected laser beam pointer.

3. The computer controlled display system of claim 2 wherein said wireless connection means is an infrared beam.

4. The computer controlled display system of claim 2 wherein said wireless connection means includes means associated with said display screen for sensing said projected laser beam.

5. The computer controlled display system of claim 4 wherein said wireless connection includes laser beam sensors that sense the position of the projected laser beam with respect to the display screen.

6. The computer controlled display system of claim 2 wherein said wireless connection means includes camera apparatus capturing said display screen with said projected laser bean pointer image.

7. The computer controlled display system of claim 2 wherein:
   said display screen is rectangular; and
   said wireless connection means includes means for orthogonally defining a pair of diagonal vertices of said rectangular screen relative to the position of said projected laser beam pointer image on said screen.

8. A wireless laser apparatus for projecting a laser beam pointer image onto a computer controlled display screen comprising:
   means for interactively moving said projected laser pointer image orthogonally with respect to said display screen; and
   wireless means for transmitting the position of said laser beam pointer image on said screen to said computer controlling said display.

9. The wireless laser apparatus of claim 8 wherein said apparatus is handheld.

10. The wireless laser apparatus of claim 9 wherein said wireless means for transmitting is infrared transmitting means.

11. The wireless laser apparatus of claim 8 including a mouse housing comprising:
    said means for interactively moving said projected laser pointer image orthogonally with respect to said display screen; and
    said wireless means for transmitting the position of said laser beam pointer image on said screen to said computer controllimg said display;
    and further comprising:
    means for scrolling the position of the projected laser beam pointer image with respect to said screen; and
    at least one mouse button for enabling a user to make an interactive selection on said display screen.

12. The wireless laser apparatus of claim 11 wherein said wireless means for transmitting the position of said laser beam pointer includes an infrared beam.

13. In a computer controlled user interactive display system, a method tar enabling an interactive user to select specific items on a display screen comprising:
    projecting a laser beam pointer image onto said display screen;
    interactively moving said projected laser pointer orthogonally with respect to said display screen;
    tracking said orthogonal movement and position of said projected laser beam pointer with respect to the display screen; and
    enabling said user to make interactive selections on said display screen basedupon said orthogonal position of said projected laser beam pointer.

14. The method of claim 13 further including the step of wirelessly tracking the orthogonal movement and position of said projected laser beam pointer.

15. The method of claim 14 wherein:
    said display screen is rectangular; and
    said wireless tracking step includes the steps of orthogonally defining a pair of diagonal vertices of said rectangular screen relative to the position of said projected laser beam pointer image on said screen.

16. The computer program of claim 14 wherein:
    said display screen is rectangular; and
    in said wireless tracking, the program causes the computer to orthogonally define a pair of diagonal vertices of said rectangular screen relative to the position of said projected laser beam pointer image on said screen.

17. A computer program comprising a computer useable storage medium substrate having a computer readable program stored thereon for enabling an interactive user to select specific items on a display screen, wherein the computer readable program when executed on a computer causes the computer to:

project a laser beam pointer image onto said display screen;

enable said user to interactively move said projected laser pointer orthogonally with respect to said display screen;

track said orthogonal movement and position of said projected laser heam pointer with respect to the display screen; and enable said user to make interactive selections on said display screen based upon said orthogonal position of said projected laser beam pointer.

18. The computer program of claim 17 wherein the computer program when executed causes the computer to wirelessly track the orthogonal movement and position of said projected laser beam pointer.

* * * * *